(12) United States Patent
Nanba

(10) Patent No.: US 7,227,696 B1
(45) Date of Patent: Jun. 5, 2007

(54) ZOOM LENS AND IMAGE PICKUP APPARATUS HAVING THE SAME

(75) Inventor: Norihiro Nanba, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/563,936

(22) Filed: Nov. 28, 2006

(30) Foreign Application Priority Data

Nov. 29, 2005 (JP) ............... 2005-343954

(51) Int. Cl.
*G02B 15/14* (2006.01)

(52) U.S. Cl. ............... 359/682; 359/689; 359/716; 359/740; 359/783

(58) Field of Classification Search ........ 359/680–686, 359/689, 716, 740, 781, 783
See application file for complete search history.

(56) References Cited

U.S. PATENT DOCUMENTS

| | | | |
|---|---|---|---|
| 6,038,084 A * | 3/2000 | Okada et al. ............... | 359/689 |
| 7,061,685 B2 * | 6/2006 | Itoh ........................... | 359/682 |
| 2005/0041303 A1 * | 2/2005 | Nanba et al. ............... | 359/680 |
| 2006/0082900 A1 * | 4/2006 | Sugiyama et al. .......... | 359/689 |
| 2006/0114574 A1 * | 6/2006 | Sekita ......................... | 359/689 |
| 2006/0181782 A1 * | 8/2006 | Shirota ....................... | 359/689 |
| 2006/0238889 A1 * | 10/2006 | Nanba et al. ............... | 359/689 |
| 2006/0238890 A1 * | 10/2006 | Nanba et al. ............... | 359/689 |
| 2006/0250700 A1 * | 11/2006 | Sekita ......................... | 359/680 |
| 2007/0053072 A1 * | 3/2007 | Nanba ......................... | 359/689 |

FOREIGN PATENT DOCUMENTS

| | | |
|---|---|---|
| JP | 2001-066503 A | 3/2001 |
| JP | 2001-281545 A | 10/2001 |
| JP | 2005-134746 A | 5/2005 |

* cited by examiner

*Primary Examiner*—Evelyn A. Lester

(57) ABSTRACT

At least one exemplary embodiment is directed to a zoom lens includes first, second, and third lens units having negative, positive, and positive refractive powers, respectively, in order from an object side to an image side and performs zooming by moving each lens unit. The first lens unit includes a negative lens whose surface on the image side has a concave shape and a positive lens whose surface on the object side has a convex shape in order from the object side to the image side. At least one surface of the negative lens has an aspheric shape.

10 Claims, 12 Drawing Sheets

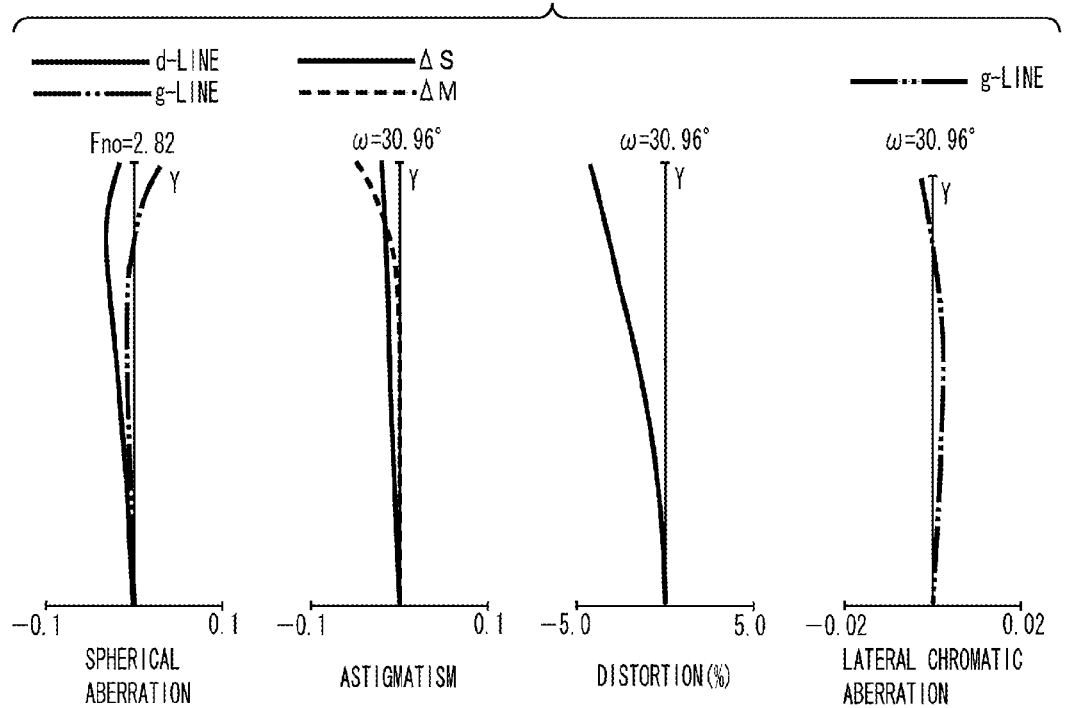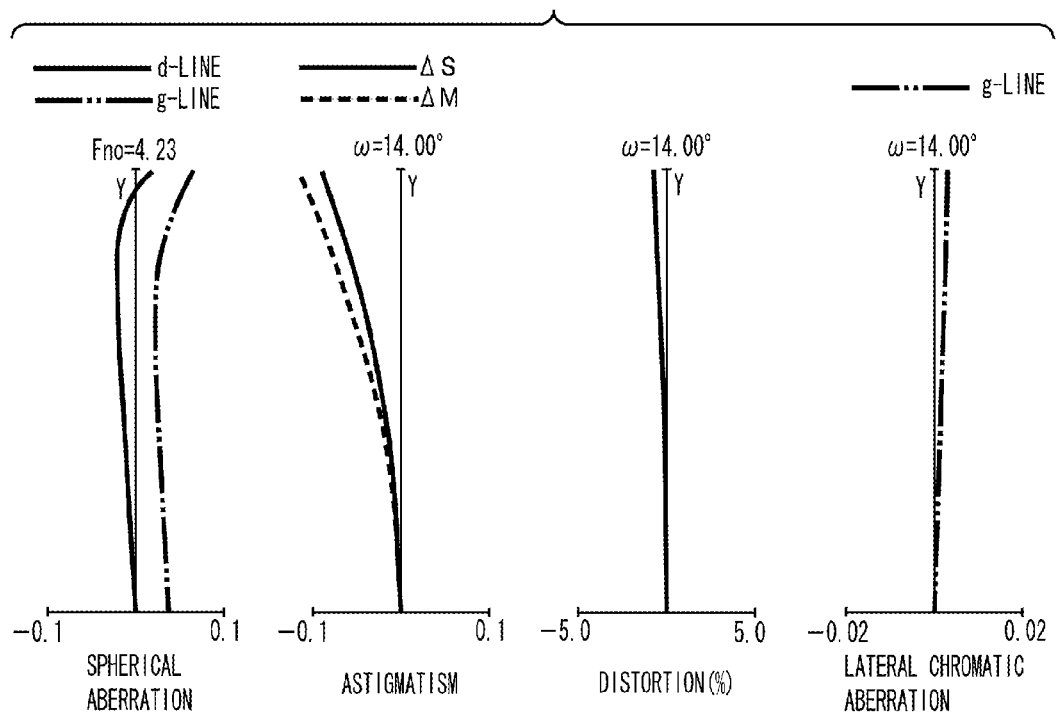

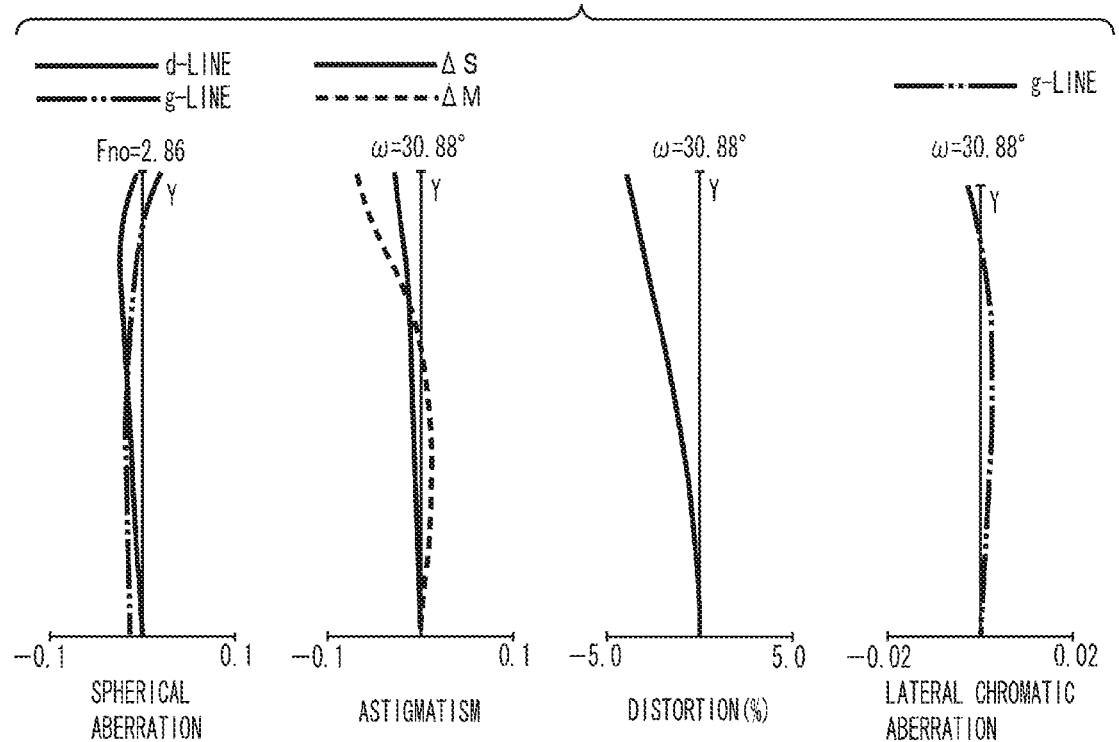
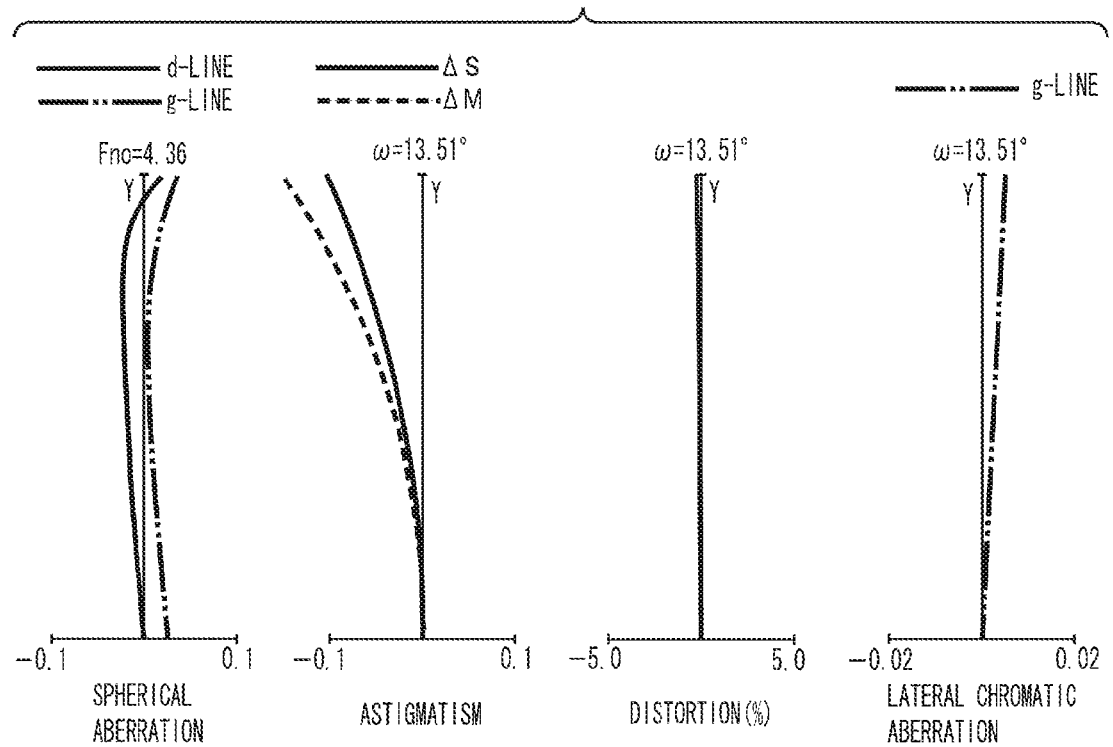

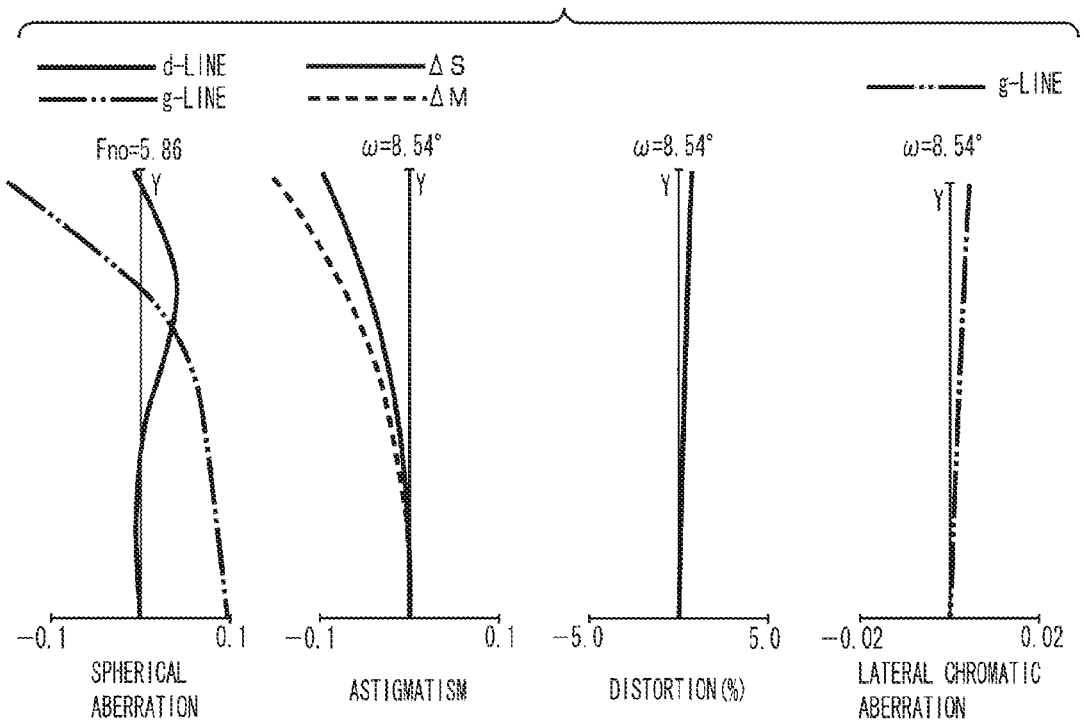

ZOOM LENS AND IMAGE PICKUP APPARATUS HAVING THE SAME

BACKGROUND OF THE INVENTION

1. Field of the Invention

The present invention relates to a zoom lens that can be used, for example in an image pickup apparatus.

2. Description of the Related Art

A small zoom lens having a high zoom ratio is useful for an image pickup apparatus (e.g., camera, a video camera and a digital still camera) that uses a solid-state image sensor.

In this type of camera, various types of optical members such as a low-pass filter and a color correction filter are disposed between a rearmost portion of a lens and a solid-state image sensor.

Thus, it is useful that a zoom lens for use in these types of cameras has a relatively long back focus.

An optical system in which a long back focus can be secured includes a negative lead type zoom lens in which a lens unit having a negative refractive power is located in the forefront.

Meanwhile, in the case of a color camera that uses a solid-state image sensor for a color image, a zoom lens having good telecentric characteristics on an image side is useful in order to prevent a color shading from occurring.

Conventionally, a three-unit zoom lens is known which includes a first lens unit having a negative refractive power, a second lens unit having a positive refractive power, and a third lens unit having a positive refractive power, in order from an object side to an image side, which has a small front lens element, and whose image side is telecentric (Japanese Patent Application Laid-Open No. 2001-66503 and Japanese Patent Application Laid-Open No. 2001-281545).

In addition, a three-unit zoom lens is known whose first lens unit includes two lenses, namely a negative lens and a positive lens, which uses a glass material having a high refractive index for the negative lens, and which includes a lens whose one surface is aspheric (U.S. Pat. No. 7,061,685).

The market has strongly desired that a zoom lens for use in a video camera or a digital camera is small and has a high zoom ratio.

In the above-mentioned three-unit zoom lens including lens units respectively having negative, positive, and positive refractive powers, a moving stroke of the second lens unit increases as the zoom ratio becomes higher. As a result, the entire length of a lens system becomes long and it is difficult to miniaturize the lens system and obtain a high zoom ratio at the same time. Accordingly, most three-unit lenses have a zoom magnification (zoom ratio) of about 3×.

In addition, the thickness of an image pickup apparatus is reduced by using a retraction method in which an interval of the lens units is shortened in a non-photographing state.

In this regard, in order to further reduce the thickness of an image pickup apparatus, it is necessary that the thickness of the lens units is reduced.

U.S. Pat. No. 7,061,685 discusses a three-unit zoom lens whose first lens unit includes a negative lens and a positive lens so as to reduce the thickness of the lens unit and to correct or reduce aberration.

In a three-unit zoom lens, a configuration of a first lens unit having a negative refractive power is significant in correcting or reducing variation of aberration occurring during zooming and in miniaturizing the entire lens system.

SUMMARY OF THE INVENTION

At least one exemplary embodiment is directed to a zoom lens that can be used in an image pickup apparatus (e.g., a digital still camera, a video camera and other image pickup apparatus as known by one of ordinary skill in the relevant arts).

At least one exemplary embodiment of the present invention is directed to a zoom lens, in a three-unit zoom lens, having a high optical performance, whose lens system is small in size as a whole, and which has a high zoom ratio with an appropriate lens configuration of each lens unit, especially a lens configuration of a first lens unit, and is also directed to an image pickup apparatus having the zoom lens.

According to an aspect of the present invention, a zoom lens includes, in order from an object side to an image side: a first lens unit having a negative refractive power; a second lens unit having a positive refractive power; and a third lens unit having a positive refractive power, in which an interval between the first lens unit and the second lens unit at a telephoto end is smaller than an interval between the first lens unit and the second lens unit at a wide-angle end, in which an interval between the second lens unit and the third lens unit at the telephoto end is larger than an interval between the second lens unit and the third lens unit at the wide-angle end, in which the first lens unit includes, in order from the object side to the image side, a negative lens whose surface on the image side has a concave shape and a positive lens whose surface on the object side has a convex shape, in which at least one surface of the negative lens has an aspheric shape, and in which a refractive index of a material of the negative lens (N11), a thickness of a center portion of the negative lens (DC), a distance from a surface vertex on a lens surface of the negative lens on the object side to an optical effective diameter thereof along an optical axis (SG1), a distance from a surface vertex on a lens surface of the negative lens on the image side to an optical effective diameter thereof along the optical axis (SG2), a focal length of the first lens unit (f1), and a focal length of the zoom lens at the telephoto end (ft) satisfy the following conditions:

$1.84 < N11 < 2.00$ $2.2 < (DC - SG1 + SG2)/DC < 3.2$ $0.5 < |f11|/ft < 0.8$.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate some exemplary embodiments, and features of the invention and, together with the description, serve to explain some of the principles of the invention.

FIG. 2 is an aberration chart of the zoom lens at a wide-angle end according to the first exemplary embodiment of the present invention.

FIG. 3 is an aberration chart of the zoom lens at a middle focal length according to the first exemplary embodiment of the present invention.

FIG. 6 is an aberration chart of the zoom lens at a wide-angle end according to the second exemplary embodiment of the present invention.

FIG. 7 is an aberration chart of the zoom lens at a middle focal length according to the second exemplary embodiment of the present invention.

FIG. 8 is an aberration chart of the zoom lens at a telephoto end according to the second exemplary embodiment of the present invention.

DETAILED DESCRIPTION OF THE EMBODIMENTS

Figure 1:
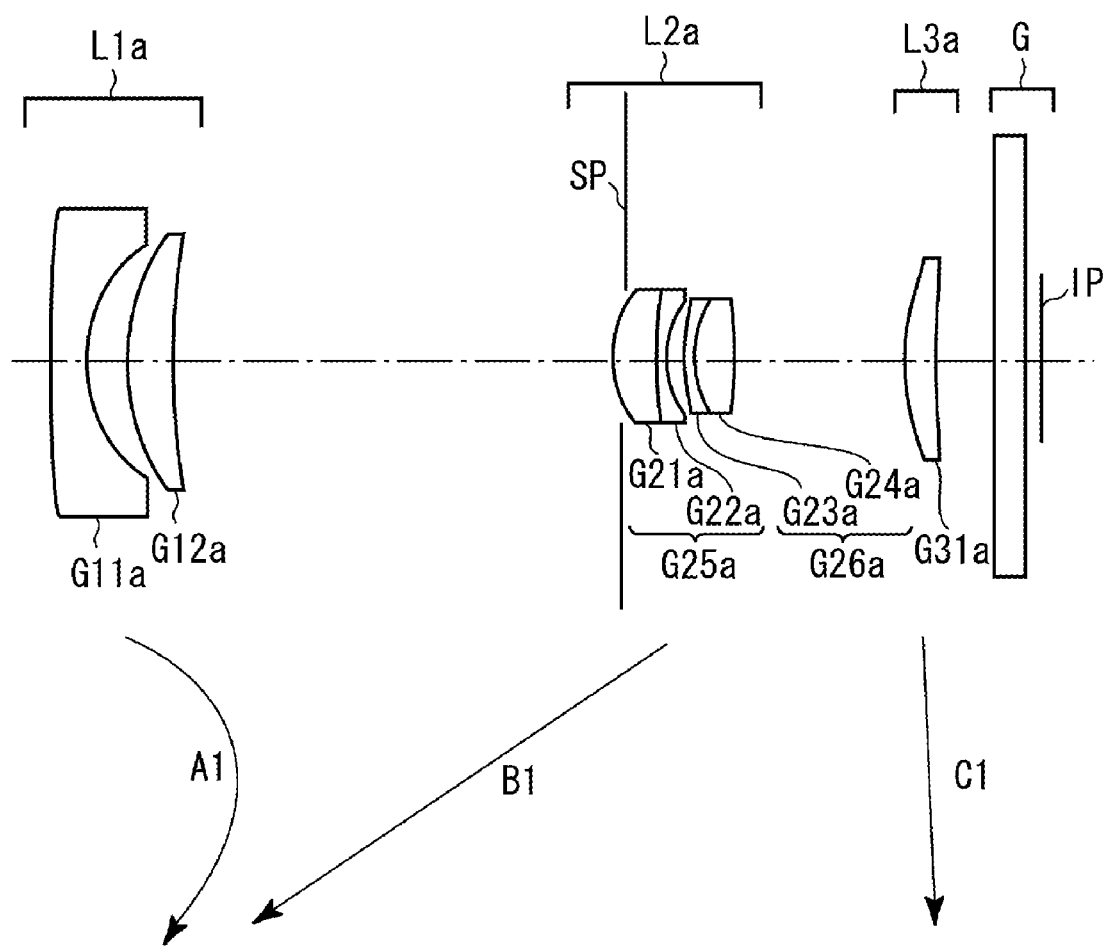
FIG. 1 is an optical cross section of a zoom lens according to a first exemplary embodiment of the present invention.

Various exemplary embodiments, features, and aspects of the invention will be described in detail below with reference to the drawings. It should be noted that the relative arrangement of the components, the numerical expressions and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

An exemplary embodiment is directed to a zoom lens, in a three-unit zoom lens, having a high optical performance, whose lens system is small in size as a whole, and which has a high zoom ratio with an appropriate lens configuration of each lens unit, especially a lens configuration of a first lens unit, and is also directed to an image pickup apparatus having the zoom lens.

Figure 4:
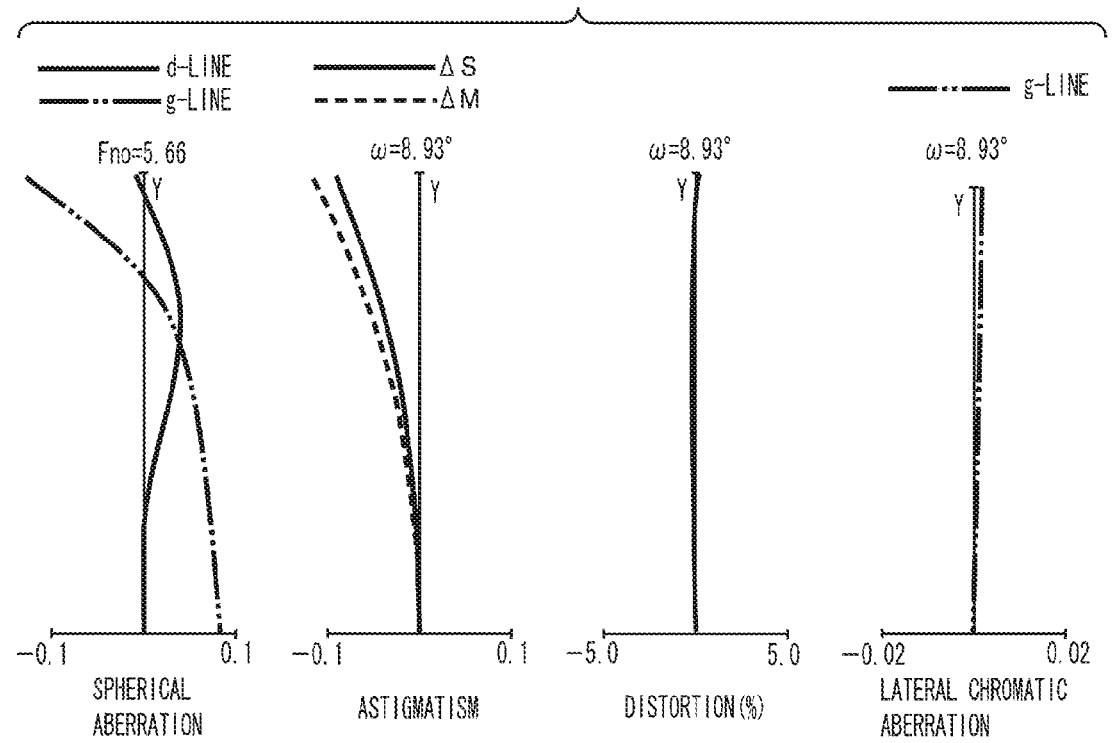
FIG. 4 is an aberration chart of the zoom lens at a telephoto end according to the first exemplary embodiment of the present invention.

FIG. 1 illustrates a cross section of a zoom lens at a wide-angle end (a short focal length end) according to a first exemplary embodiment of the present invention. FIG. 2, FIG. 3, and FIG. 4 respectively show an aberration chart at the wide-angle end, an aberration chart at a middle focal length, and an aberration chart at a telephoto end (a long focal length end) for the zoom lens according to the first exemplary embodiment of the present invention. The first exemplary embodiment is directed to a zoom lens having a zoom ratio of about 3.81 and an aperture ratio ranging from about 2.83 to about 5.67.

Figure 5:
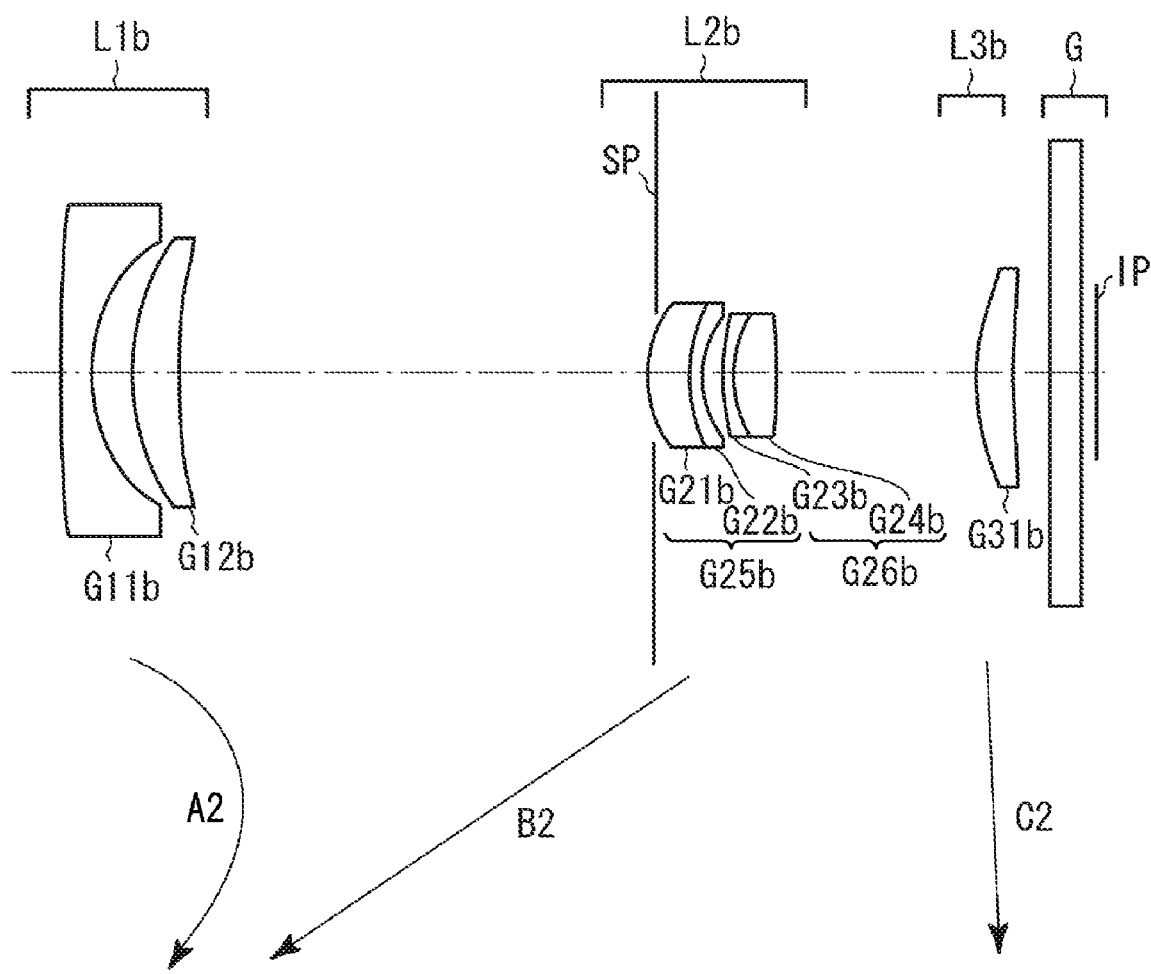
FIG. 5 is an optical cross section of a zoom lens according to a second exemplary embodiment of the present invention.

FIG. 5 illustrates a cross section of a zoom lens at a wide-angle end according to a second exemplary embodiment of the present invention. FIG. 6, FIG. 7, and FIG. 8 respectively show an aberration chart at the wide-angle end, an aberration chart at a middle focal length, and an aberration chart at a telephoto end for the zoom lens according to the second exemplary embodiment of the present invention. The second exemplary embodiment is directed to a zoom lens having a zoom ratio of about 3.99 and an aperture ratio ranging from about 2.87 to about 5.86.

Figure 9:
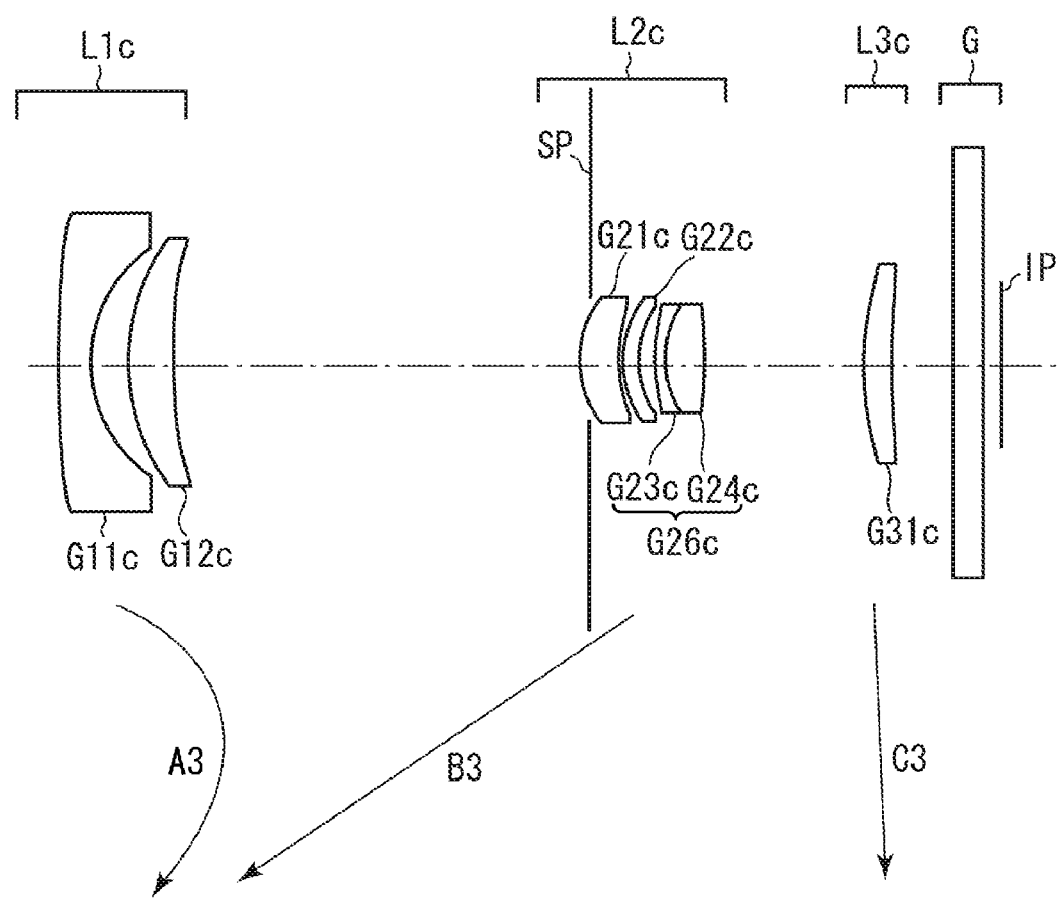
FIG. 9 is an optical cross section of a zoom lens according to a third exemplary embodiment of the present invention.
Figure 10:
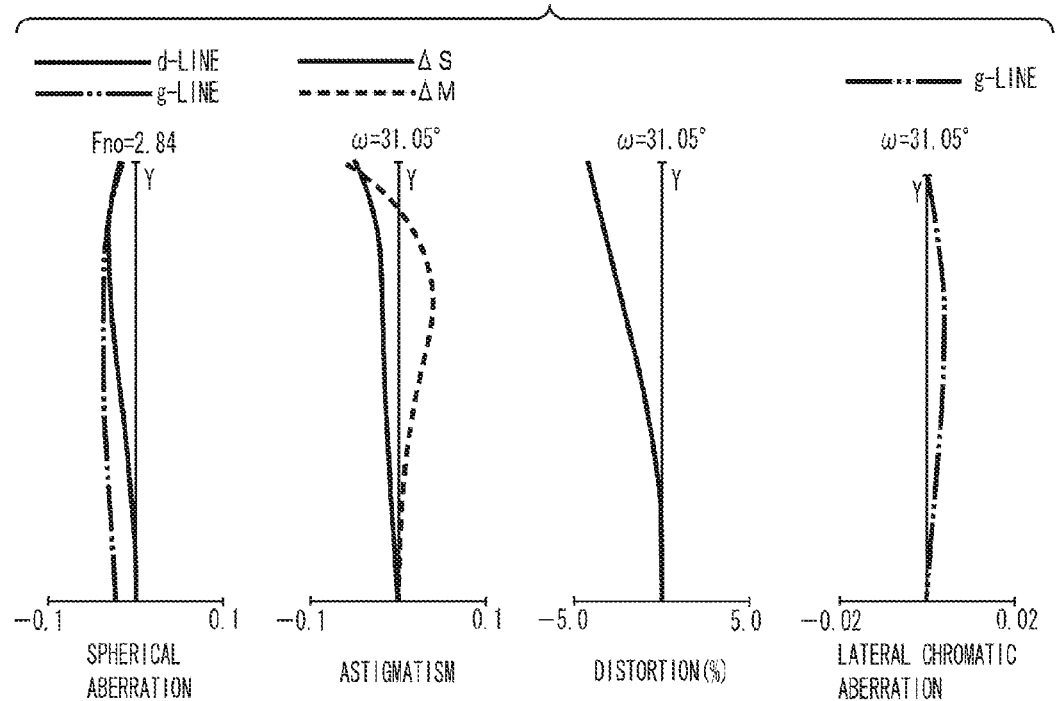
FIG. 10 is an aberration chart of the zoom lens at a wide-angle end according to the third exemplary embodiment of the present invention.
Figure 11:
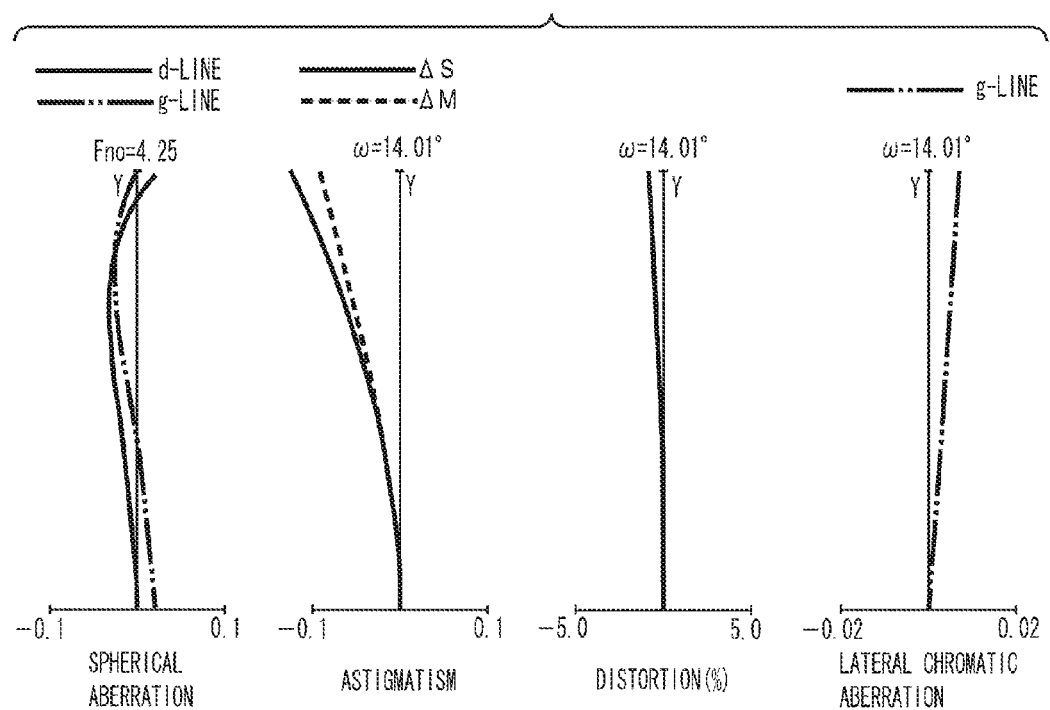
FIG. 11 is an aberration chart of the zoom lens at a middle focal length according to the third exemplary embodiment of the present invention.
Figure 12:
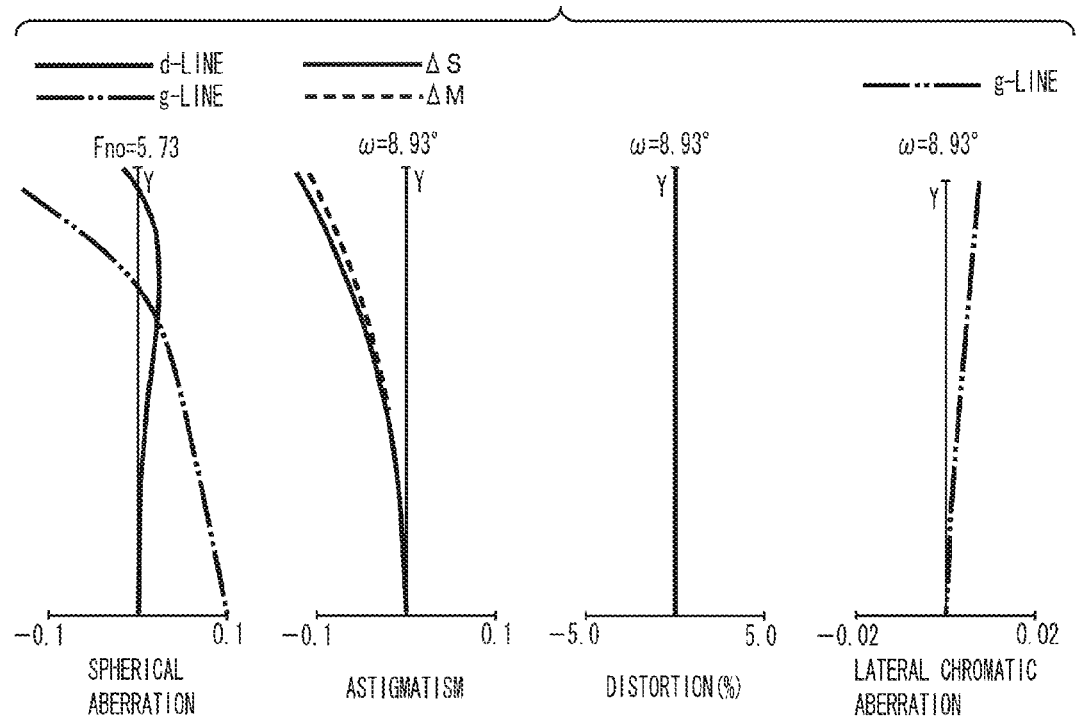
FIG. 12 is an aberration chart of the zoom lens at a telephoto end according to the third exemplary embodiment of the present invention.

FIG. 9 illustrates a cross section of a zoom lens at a wide-angle end according to a third exemplary embodiment of the present invention. FIG. 10, FIG. 11, and FIG. 12 respectively show an aberration chart at the wide-angle end, an aberration chart at a middle focal length, and an aberration chart at a telephoto end for the zoom lens according to the third exemplary embodiment of the present invention. The third exemplary embodiment is directed to a zoom lens having a zoom ratio of about 3.83 and an aperture ratio ranging from about 2.85 to about 5.73.

Figure 13:
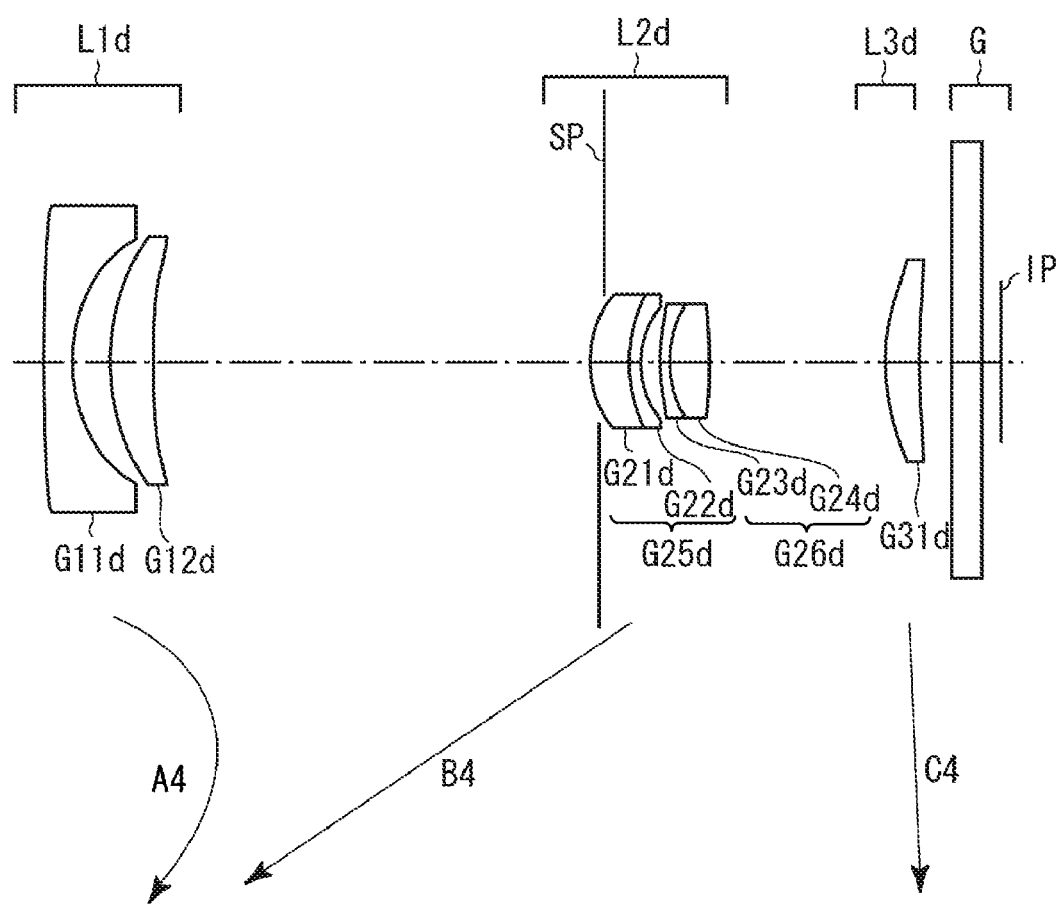
FIG. 13 is an optical cross section of a zoom lens according to a fourth exemplary embodiment of the present invention.
Figure 14:
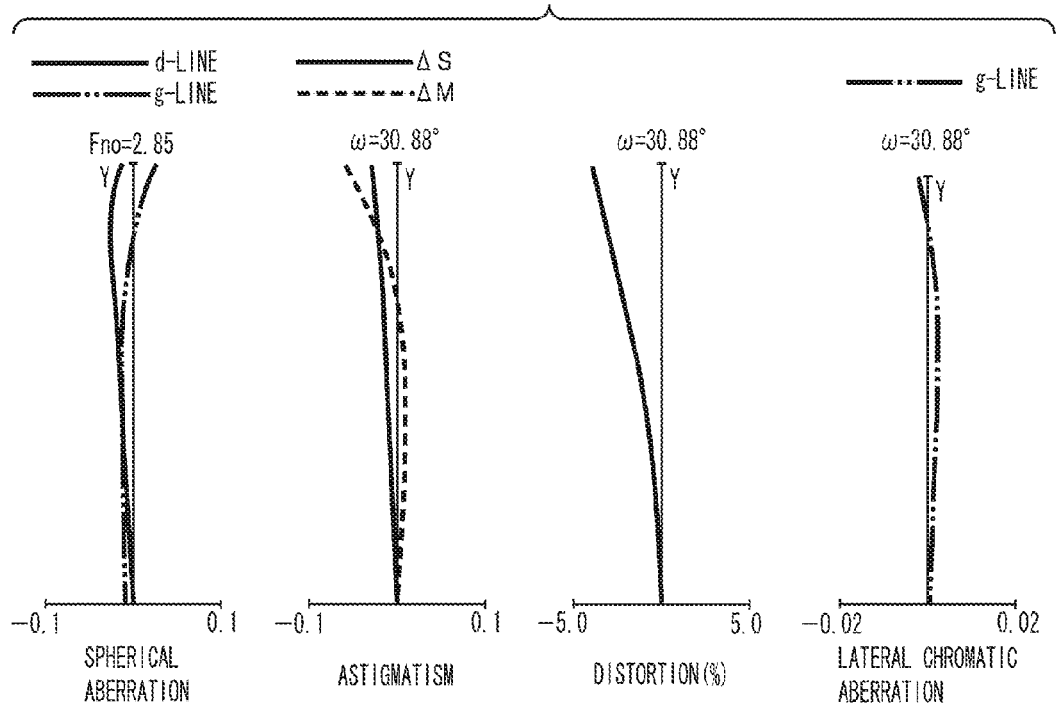
FIG. 14 is an aberration chart of the zoom lens at a wide-angle end according to the fourth exemplary embodiment of the present invention.
Figure 15:
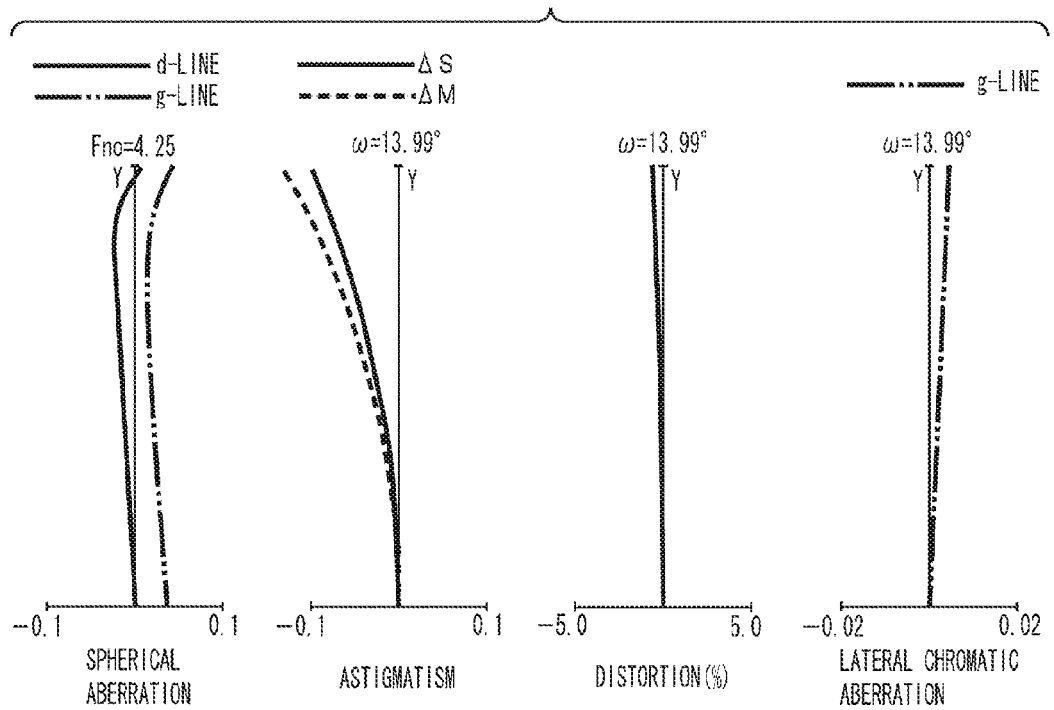
FIG. 15 is an aberration chart of the zoom lens at a middle focal length according to the fourth exemplary embodiment of the present invention.
Figure 16:
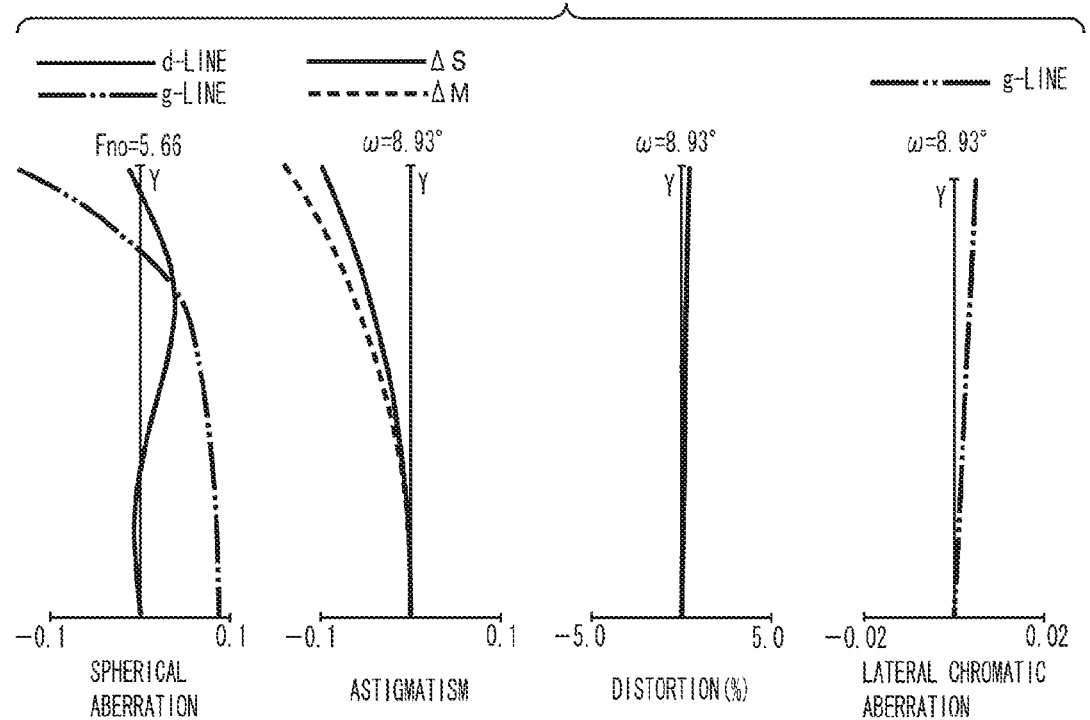
FIG. 16 is an aberration chart of the zoom lens at a telephoto end according to the fourth exemplary embodiment of the present invention.

FIG. 13 illustrates a cross section of a zoom lens at a wide-angle end according to a fourth exemplary embodiment of the present invention. FIG. 14, FIG. 15, and FIG. 16 respectively show an aberration chart at the wide-angle end, an aberration chart at a middle focal length, and an aberration chart at a telephoto end for the zoom lens according to the fourth exemplary embodiment of the present invention. The fourth exemplary embodiment is directed to a zoom lens having a zoom ratio of about 3.81 and an aperture ratio ranging from about 2.86 to about 5.67.

Figure 17:
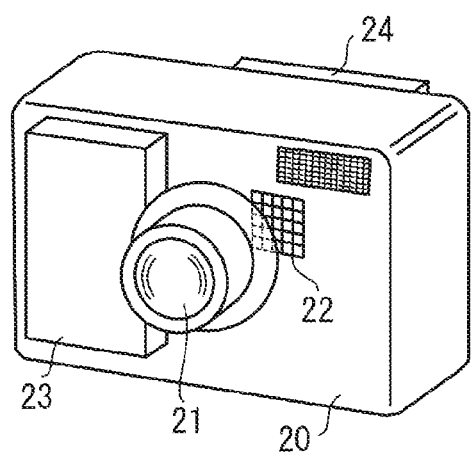
FIG. 17 schematically illustrates portions of an image pickup apparatus according to an exemplary embodiment of the present invention.

FIG. 17 is a schematic diagram illustrating portions of a digital still camera (image pickup apparatus) having the zoom lens according to an exemplary embodiment of the present invention.

The zoom lens according to each exemplary embodiment can be a photographic lens system for use with an image pickup apparatus. In each of the diagrams showing a cross section of a zoom lens, an object side (front side) is shown at a left-hand portion of the drawing, and an image side (back side) is shown at a right-hand portion thereof.

Referring to each of FIG. 1, FIG. 5, FIG. 9, and FIG. 13, a zoom lens includes a first lens unit L1$a$-$d$ having a negative refractive power (optical power: an inverse of a focal length), a second lens unit L2$a$-$d$ having a positive refractive power, and a third lens unit L3$a$-$d$ having a positive refractive power.

The zoom lens can further include an F number determination member SP (hereinafter also referred to as "an aperture stop") that operates as an aperture stop that determines (restricts) a light flux for a full-aperture F number (Fno).

In each of FIG. 1, FIG. 5, FIG. 9, and FIG. 13, "G" denotes an optical block (glass block) that is equivalent to an optical filter, a face plate, a liquid crystal low-pass filter, and an infrared-ray cut filter, or other type of optical filter as known by one of ordinary skill in the relevant arts. In addition, "IP" denotes an image plane, for example on which an imaging plane of a solid-state image sensor (photoelectric conversion element) such as a charge-coupled device (CCD) sensor or a complementary metal-oxide semiconductor (CMOS) sensor is positioned when the zoom lens is used as a photographic optical system for a video camera or a digital still camera.

In another example, in the image plane IP, a photosensitive plane that is equivalent to a film surface can be positioned when the zoom lens is used as a photographic optical system for a silver-halide film camera.

In each of the aberration charts, "d" and "g" respectively denote d-line and g-line light. "ΔM" and "ΔS" respectively denote a meridional image plane and a sagittal image plane. Lateral chromatic aberration is represented with g-line light. The Y-axis in the spherical aberration's graph is entrance pupil radius, the Y-axis in the astigmatism's, distortion's and chromatic aberration of magnification's graphs is image height.

"Fno" denotes an F number, and "ω" denotes a semifield angle.

In each exemplary embodiment, the second lens unit L2a-d, which serves as a lens unit for varying magnification, moves in one direction (for example, does not move reciprocatingly) during zooming from the wide-angle end to the telephoto end. In this regard, in each of exemplary embodiments described below, each of the wide-angle end and the telephoto end refers to a zooming position when a lens unit for varying magnification (the second lens unit L2a-d) is located at each of the ends of a range in which the second lens unit L2a-d can mechanically move along an optical axis.

In a zoom lens according to each exemplary embodiment, during zooming from the wide-angle end to the telephoto end, the first lens unit L1a-d moves backward and forward with a locus convex toward the image side, the second lens unit L2a-d moves toward the object side, and the third lens unit moves toward the image side.

Zooming is performed by moving each lens unit so that an interval between the first lens unit L1a-d and the second lens unit L2a-d is smaller at the telephoto end than at the wide-angle end and an interval between the second lens unit L2a-d and the third lens unit L3a-d is larger at the telephoto end than at the wide-angle end. In other words, each lens unit is moved during zooming so that the interval between the first lens unit L1a-d and the second lens unit L2a-d at the telephoto end is smaller than the interval between the first lens unit L1a-d and the second lens unit L2 at the wide-angle end. In addition, each lens unit is moved during zooming so that the interval between the second lens unit L2a-d and the third lens unit L3a-d at the telephoto end is larger than the interval between the second lens unit L2a-d and the third lens unit L3a-d at the wide-angle end.

In the zoom lens according to each exemplary embodiment, variation of magnification is mainly performed by moving (B1-B4) the second lens unit L2a-d. The first lens unit L1a-d makes a reciprocating movement (A1-A4) to compensate for movement of an image point caused by the variation of magnification.

The F number determination member SP is disposed between a vertex on the object side of a lens G21a-d of the second lens unit L2a-d disposed closest to the object side and a point of intersection of a surface of the lens G21a-d on the object side and a circumferential portion (lens side face edge portion) of the lens G21a-d as viewed in the optical axis direction.

As described above, the F number determination member SP is disposed within the second lens unit L2a-d. Additionally, the F number determination member SP is moved (B1-B4) together with the second lens unit L2a-d during zooming, so that a distance between an entrance pupil and the first lens unit L1a-d is shortened at the wide-angle end.

Disposing the aperture stop SP in this manner facilitates reducing the interval between the first lens unit L1a-d and the second lens unit L2a-d at the telephoto end. Accordingly, the amount of movement of the second lens unit L2a-d toward the object side for zooming can be secured well. Thus, a zoom lens having a high zoom ratio can be obtained while avoiding an increase in the total length of the zoom lens at the telephoto end.

In order to adjust the amount of light, a diaphragm unit that is capable of performing a small diaphragm or a unit for inserting and removing a neutral-density (ND) filter can be provided on the image side of the second lens unit L2a-d.

Next, a description is made as to specific characteristics of the configuration of the zoom lens.

The first lens unit L1a-d includes a negative lens G11a-d having a concave surface facing the image side and a positive meniscus lens G12a-d having a convex surface facing the object side, in order from the object side to the image side. With this configuration, the entire lens system is miniaturized with a small number of lenses while correcting or reducing various aberrations. The configuration of the first lens unit can include three (or more) lenses by adding a positive lens or a negative lens between the negative lens G11a-d and the positive lens G12a-d or by adding a positive lens on the image side of the positive lens G12a-d. However, considering the miniaturization of the lens system, the configuration including two lenses, namely the negative lens G11a-d and the positive lens G12a-d, is useful as well.

In addition, in each exemplary embodiment, one or more aspheric surfaces are used. With this configuration, distortion and field curvature can be corrected or reduced in a zooming area at the wide-angle end, and spherical aberration can be corrected or reduced in a zooming area at the telephoto end. An aspheric surface is provided on the lens surface of the negative lens G11a-d on the image side. The aspheric surface is shaped such that a curvature becomes smaller from the center of the lens to the periphery of the lens. With this shape, various aberrations are corrected or reduced.

An aspheric surface can be provided on the lens surface of the negative lens G11a-d on the object side. The aspheric shape in this case can be such that a curvature gradually increases from the center of the lens to the periphery of the lens.

In addition, both surfaces of the negative lens G11a-d can be shaped in an aspheric shape.

Furthermore, a material having a high refractive index of more than about 1.84 can be used for the negative lens G11a-d. By using a material having a high refractive index, the thickness of the lens in the peripheral portion can be reduced so as to miniaturize and reduce the thickness of the first lens unit L1a-d.

In addition, with this material, image plane characteristics at the wide-angle end can be corrected or reduced.

If the positive lens G12a-d has a too intensive meniscus shape, an interference between an outer peripheral portion of the lens surface of the positive lens G12a-d on the image side and a lens barrel for the second lens unit L2a-d can occur at the telephoto end.

On the other hand, in order to prevent and/or reduce the effect of this interference from occurring, the interval between the first lens unit L1a-d and the second lens unit L2a-d at the telephoto end can be increased. However, if the interval between the first lens unit L1a-d and the second lens unit L2a-d at the telephoto end is increased, the total length of the zoom lens increases and, therefore, the miniaturization of the entire lens system is hardly achieved. In this regard, by optimally setting the degree of meniscus of the positive lens G12a-d so that the degree of meniscus of the positive lens G12a-d satisfies a conditional expression (6), which is to be described later below, the entire lens system can be miniaturized while correcting or reducing various aberrations.

The second lens unit L2a-d includes at least one cemented lens having a positive refractive power including a positive lens and a negative lens.

More specifically, in the first, second, and fourth exemplary embodiments shown in FIG. 1, FIG. 5, and FIG. 13, respectively, the second lens unit L2a,b,d includes a positive cemented lens G25a,b,d including a positive lens G21a-d and a negative lens G22a,b,d and a positive cemented lens including a negative lens G23a,b,d and a positive lens G24a,b,d, in order from the object side to the image side.

In the third exemplary embodiment shown in FIG. 9, the second lens unit L2c includes a positive lens G21c, a negative lens G22c, and a positive cemented lens G26c including a negative lens G23c and a positive lens G24c, in order from the object side to the image side.

In the third exemplary embodiment shown in FIG. 9, the positive lens G21c and the negative lens G22c are separated from each other. However, the positive lens G21c and the negative lens G22c can be mutually joined to be a cemented lens.

In the second lens unit L2a-d, aberration can vary due to variation of magnification. Accordingly, the variation of aberration occurring during the variation of magnification is reduced by allowing the second lens unit L2a-d to have a relatively symmetrical lens configuration. The second lens unit L2a-d is set to have a unit magnification at a middle focal length. The second lens unit L2a-d includes a positive lens, a negative lens, a negative lens, and a positive lens, which configuration is a developed form of a triplet configuration. With this configuration, various aberrations can be corrected or reduced and the variation of aberration due to variation of magnification can be reduced. Especially when a high magnification ratio is useful, it is effective in correcting or reducing aberration to use the second lens unit L2a-d that has the lens configuration described above.

The positive lens G21a-d in the second lens unit L2a-d, which is disposed closest to the object side, has a convex surface facing the object side so that various off-axis aberrations do not occur much even when an off-axis principal ray exiting from the first lens unit L1a-d is greatly refracted.

In addition, the surface of the positive lens G21a-d on the object side can have a convex shape so as to reduce the amount of spherical aberration occurring with respect to on-axis light fluxes exiting from the first lens unit L1a-d in a diverged state. Furthermore, the lens surface of the positive lens G21a-d on the object side can be in an aspheric shape. With this configuration, spherical aberration occurring when the lens diameter is large can be corrected or reduced.

In addition, the surface of the negative lens G22a-d on the image side can be in a concave shape. With this configuration, coma aberration occurring on the lens surface of the positive lens G21a-d on the object side can be corrected or reduced on the lens surface of the negative lens G22a-d on the image side.

With the above configuration such that the positive lens G21a-d and the negative lens G22a-d have the above-described shapes, both spherical aberration and coma aberration can be corrected or reduced.

Because the cemented lens G25a-d, which includes the positive lens G21a-d and the negative lens G22a-d, can have a meniscus shape as a whole, the refractive power thereof cannot be too intensive. In this regard, in each exemplary embodiment, the cemented lens G26a-d, which is disposed on the image side of the cemented lens G25a-d, undertakes a positive refractive power of the second lens unit L2a-d. In order to reduce the thickness of the cemented lens G26a-d having such an intense refractive power, it is effective to use a glass material of high refractive index. In this regard, however, it is also useful to secure achromaticity in a cemented lens. Thus, each of glass materials for the negative lens G23a-d and the positive lens G24a-d of the cemented lens G26a-d has a high refractive index and has an Abbe number that is mutually different to a given extent. In addition, the cemented lens G26a-d has an appropriate refractive power distribution so as to implement achromatization and to reduce the thickness of the lens system.

With the above-described configuration, aberration occurring at the second lens unit L2a-d having a high zoom ratio can be reduced in the entire zooming area and the thickness of the lens system can be reduced.

In this regard, the positive lens G21a-d and the negative lens G22a-d are not necessarily configured as a cemented lens. That is, the positive lens G21a-d and the negative lens G22a-d can be separated from each other as long as spherical aberration and coma aberration can be corrected or reduced. In addition, the positive lens G21a-d and the negative lens G22a-d can be substituted with one meniscus lens having a convex surface facing the object side. In this case, chromatic aberration can be corrected by the cemented lens G26a-d.

The third lens unit L3a-d can have a positive refractive power. The third lens unit L3a-d can serve as a field lens to implement a telecentric image formation on the image side in an image pickup apparatus that uses a solid-state image sensor.

The third lens unit L3a-d is moved (C1-C4) toward the image side during zooming from the wide-angle end to the telephoto end. However, the configuration in each exemplary embodiment can be arranged such that the third lens unit L3a-d remains stationary during zooming. If the third lens unit L3a-d remains stationary, a mechanical member and an actuator for driving the third lens unit L3a-d are not necessary. In addition, if the third lens unit L3a-d moves during zooming, it is useful that the third lens unit L3a-d does not move toward the object side during zooming from the wide-angle end to the telephoto end. If the third lens unit L3a-d moves toward the object side, the magnification of the third lens unit L3a-d is reduced. Accordingly, the zoom ratio of the entire lens system is lowered. That is, in order to obtain a high zoom ratio, the configuration can be arranged such that the interval between the second lens unit L2a-d and the third lens unit L3a-d increases as zooming goes from the wide-angle end toward the telephoto end. In addition, when the third lens unit L3a-d is moved toward the image side during zooming from the wide-angle end to the telephoto end, the effect of magnification increases.

With respect to a zoom lens according to each exemplary embodiment, the third lens unit L3a-d, which includes a small number of lenses, performs focusing. With this configuration, a focusing lens unit can be [D]miniaturized.

In each exemplary embodiment described above, three lens units can be moved during zooming. However, instead of the configuration in which the three lens units are moved, a configuration in which two lens units (for example, the first lens unit L1a-d and the second lens unit L2a-d; the first lens unit L1a-d and the third lens unit L3a-d; and the second lens unit L2a-d and the third lens unit L3a-d) are moved to change the interval between the lens units can be applied to a zoom lens according to each exemplary embodiment described above.

In addition, a lens unit having a small refractive power can be added to the object side of the first lens unit L1a-d and/or the image side of the third lens unit L3a-d.

In addition, the configuration of a zoom lens according to each exemplary embodiment described above is not limited to the three-unit configuration including lens units having negative, positive, and positive refractive powers, respectively. That is, a four-unit configuration such that a second lens unit is divided into lens units having positive and positive refractive powers so as to obtain lens units having negative, positive, positive, and positive refractive powers can be applied to a zoom lens according to each exemplary embodiment described above. In addition, a four-unit configuration such that a second lens unit is divided into lens units having positive and negative refractive powers so as to obtain lens units having negative, positive, negative, and positive refractive powers can be applied to a zoom lens according to each exemplary embodiment described above.

As described above, in each exemplary embodiment, a zoom lens in which a lens unit having a negative refractive power is positioned in the forefront has a high performance and has a high zoom ratio of about 4 with the reduced thickness of lens units.

A zoom lens according to each exemplary embodiment, in order to achieve a high optical performance or to miniaturize the entire lens system, can satisfy at least one of conditional expressions described below. Thus, a meritorious effect according to each condition can be obtained.

A zoom lens according to each exemplary embodiment satisfies at least one of the following conditional expressions:

$$1.84 < N11 < 2.00 \quad (1)$$

$$2.2 < (DC - SG1 + SG2)/DC < 3.2 \quad (2)$$

$$0.5 < |f11|/ft < 0.8 \quad (3)$$

$$0.40 < f11/f1 < 0.55 \quad (4)$$

$$1.0 < (R11a + R11b)/(R11a - R11b) < 1.4 \quad (5)$$

$$-2.5 < (R12a + R12b)/(R12a - R12b) < -1.0 \quad (6)$$

$$1.0 < f3/ft < 1.5 \quad (7)$$

$$0.68 < M2/ft < 0.8 \quad (8)$$

$$0.20 < D1/ft < 0.27 \quad (9)$$

where a refractive index of the material of the negative lens G11a-d is N11, a thickness of the negative lens G11a-d at the center thereof is DC, a distance from a surface vertex on the lens surface of the negative lens G11a-d on the object side to an optical effective diameter thereof along an optical axis is SG1, a distance from a surface vertex on the lens surface of the negative lens G11a-d on the image side to an optical effective diameter thereof along the optical axis is SG2, a focal length of the first lens unit L1a-d is f1, a focal length of the zoom lens at the telephoto end is ft, a focal length of the negative lens G11a-d is f11, a radius of curvature of the lens surface of the negative lens G11a-d on the object side is R11a, a radius of curvature of the lens surface of the negative lens G11a-d on the image side is R11b, a radius of curvature of the lens surface of the positive lens G12a-d on the object side is R12a, a radius of curvature of the lens surface of the positive lens G12a-d on the image side is R12b, a focal length o the third lens unit L3a-d is f3, a maximum amount of movement of the second lens unit L2a-d along the optical axis during zooming from the wide-angle end to the telephoto end is M2 (0<M2), and a distance from the lens surface of the negative lens of the first lens unit L1a-d on the object side to the lens surface of the positive lens of the first lens unit L1a-d on the image side is D1.

A technical significance of each conditional expression is described below.

The conditional expression (1) is concerned with the refractive index of the material of the negative lens G11a-d of the first lens unit L1a-d. The conditional expression (1) is suitable to be used in manufacturing the lens by a glass mold forming method. For a material with a high refractive index that exceeds an upper limit of the conditional expression (1), there are, for example, a material with a product name S-LAH79 of Ohara Inc. and a material with a product name TAFD40 of Hoya Corporation. However, because transition points of these materials are high, it is difficult to use the materials in the glass mold forming.

There are many materials for glass mold forming whose refractive index is below a lower limit of the conditional expression (1). However, the material whose refractive index is below the lower limit of the conditional expression (1) has a low refractive index, and accordingly, in order to obtain a desired refractive index for a negative lens, the thickness of the lens at a peripheral portion thereof necessarily increases. Accordingly, the miniaturization of the lens system is difficult in this case. In addition, accordingly, it is difficult to flatten image characteristics at the wide-angle end.

The conditional expression (2) is concerned with the thickness of the peripheral portion of the lens with respect to the thickness of the center of the negative lens G11 of the first lens unit L1a-d, namely a thickness deviation ratio. If the thickness deviation ratio exceeds the upper limit of the conditional expression (2), mold release characteristics in the glass mold forming degrades so as to cause fusion bonding and cracking. In addition, when the thickness of the center of the lens is large, the thickness deviation ratio is below the lower limit of the conditional expression (2), even though the desired refractive power is useful. In this case, the dimension of the negative lens G11a-d becomes large. In order to achieve a highly precise molding and the miniaturization of the zoom lens, it is useful if the zoom lens according to each exemplary embodiment satisfies the conditional expression (2).

The conditional expression (3) is concerned with the focal length of the first lens unit L1a-d. If the focal length exceeds the upper limit of the conditional expression (3), that is, if the refractive index is too low, the refractive power distribution in the retro-focus type zoom lens is extremely weak. Accordingly, in this case, it is difficult to shorten the focal length at the wide-angle end and a desired specification cannot be satisfied. In addition, it is difficult to obtain a sufficient back focus that is necessary for inserting a filter behind the lens unit. If the focal length is below the lower limit of the conditional expression (3), that is, if the refractive power is too high, the refractive power distribution in the retro-focus type zoom lens is extremely intense. In this case, the back focus is very long, and thus miniaturization of the lens is difficult.

In addition, even when the aspheric shape is used, it is difficult to correct field curvature and distortion at the wide-angle end with a small number of lenses. Accordingly, in order to reduce the thickness of the first lens unit L1$a$-$d$ while correcting aberrations at the same time, it is useful if the lower limit of the conditional expression (3) is not exceeded.

The conditional expression (4) is concerned with the focal length of the negative lens G11$a$-$d$ of the first lens unit L1$a$-$d$. If the focal length exceeds an upper limit of the conditional expression (4), the refractive power of each of the negative lens G11$a$-$d$ and the positive lens G12$a$-$d$ is low. In this case, chromatic aberration is not corrected well by the first lens unit L1$a$-$d$. If the focal length is below the lower limit of the conditional expression (4), the refractive power of each of the negative lens G11$a$-$d$ and the positive lens G12$a$-$d$ is high. In this case, higher-order spherical aberration occurs much at the telephoto end.

The conditional expression (5) is concerned with form factors of the negative lens G11$a$-$d$ of the first lens unit L1$a$-$d$. If the degree of meniscus shape of the lens whose concave surface faces the image side exceeds an upper limit of the conditional expression (5), spherical aberration occurring at the telephoto end increases. If the degree of meniscus shape is below a lower limit of the conditional expression (5) so as to have a concave shape for both sides thereof, instead of the meniscus shape, an angle of incidence of an off-axis ray at the wide-angle end becomes sharp so as to cause much field curvature.

The conditional expression (6) is concerned with form factors of the positive lens G12$a$-$d$ of the first lens unit L1$a$-$d$. If the degree of meniscus shape of the lens whose convex surface faces the object side is below a lower limit of the conditional expression (6), spherical aberration occurring at the telephoto end is corrected too much and coma aberration occurring at the wide-angle end is corrected too much. If the degree of meniscus shape exceeds an upper limit of the conditional expression (6) so as to have a convex shape for both sides thereof, instead of the meniscus shape, an angle of incidence of an off-axis ray at the wide-angle end becomes sharp so as to cause much field curvature.

The conditional expression (7) is concerned with the focal length of the third lens unit L3$a$-$d$. If the focal length exceeds an upper limit of the conditional expression (7), that is, if the refractive index is very low, the effect of the third lens unit L3$a$-$d$ as a field lens is reduced. Accordingly, an exit pupil cannot be made distant from an image plane. Thus, when a solid-state image sensor is used, the amount of light in the peripheral portion of an image plane is much decreased. In addition, when focusing is performed by the third lens unit L3$a$-$d$, an extending amount increases. Thus, a focus stroke becomes long, and accordingly, the miniaturization of the lens system including the configuration of the lens barrel is difficult. If the focal length is below a lower limit of the conditional expression (7), that is, if the refractive power is very high, a Petzval sum tends to increase in a positive direction and field curvature increases toward an under side.

In addition, in this case, lateral chromatic aberration considerably occurs in the entire zooming area. Lateral chromatic aberration can be reduced by increasing the number of lens elements. However, if the number of lens elements is increased, it is difficult to reduce the thickness of the entire lens system.

The conditional expression (8) is concerned with the amount of movement of the second lens unit L2$a$-$d$ during zooming. If the amount of moving exceeds an upper limit of the conditional expression (8), the total length of the zoom lens is very long at the telephoto end, and accordingly, the miniaturization of the zoom lens is difficult. In addition, when the second lens unit L2$a$-$d$ includes the aperture stop SP, the F number at the telephoto end is at a dark level compared to that at the wide-angle end. Especially when a solid-state image sensor whose pixel pitch is small is used, a high modulation transfer function (MTF) at a high spatial frequency is necessary.

However, when the F number is at a dark level, it is difficult to increase the MTF at a high spatial frequency even when an aberration is corrected, due to an affect by a diffraction. If the amount of movement is below a lower limit of the conditional expression (8), the refractive power of the second lens unit L2$a$-$d$ needs to be increased in order to obtain a desired zoom ratio. In this case, however, the amount of variation of spherical aberration and coma aberration occurring during zooming increases, and accordingly, it is difficult to achieve a high optical performance in the entire zooming area.

The conditional expression (9) is concerned with the thickness of the first lens unit L1$a$-$d$ along the optical axis. If the thickness exceeds an upper limit of the conditional expression (9), the miniaturization of the zoom lens is difficult.

Especially in the case where a retractable lens barrel is used, if the thickness of the first lens unit L1$a$-$d$ is large, it is difficult to reduce the total length of the lens barrel at the time of retraction. If the thickness of the first lens unit L1$a$-$d$ is below a lower limit of the conditional expression (9), the lens thickness of each of the negative lens G11$a$-$d$ and the positive lens G12$a$-$d$ is small, and accordingly, the refractive power of the negative lens G11$a$-$d$ and the positive lens G12$a$-$d$ is low.

If the refractive power of each lens is very low, the first lens unit L1$a$-$d$ cannot correct chromatic aberration well.

In each exemplary embodiment, the range of the values in the conditional expressions (1) through (9) can further be set as follows:

$$1.845 < N11 < 1.95 \tag{1a}$$

$$2.3 < (DC-SG1+SG2)/DC < 3.1 \tag{2a}$$

$$0.55 < f1w/ft < 0.75 \tag{3a}$$

$$0.43 < f11/f1 < 0.53 \tag{4a}$$

$$1.1 < (R11a+R11b)/(R11a-R11b) < 1.3 \tag{5a}$$

$$-2.3 < (R12a+R12b)/(R12a-R12b) < -1.2 \tag{6a}$$

$$1.1 < f3/ft < 1.46 \tag{7a}$$

$$0.69 < M2/ft < 0.78 \tag{8a}$$

$$0.21 < D1/ft < 0.26 \tag{9a}$$

As described above, according to each exemplary embodiment, a zoom lens having a high zoom ratio and capable of correcting or reducing various aberrations in the entire zooming area can be obtained.

In addition, a compact zoom lens having thin lens units, in which an exit pupil is sufficiently distant from an image plane so as to be applied to a camera using a solid-state image sensor, can be obtained.

Hereinbelow, numerical examples of zoom lenses according to exemplary embodiments of the present invention are set forth. In each numerical example, "i" stands for the order of a surface from the object side, "Ri" stands for a radius of curvature of the i-th lens surface, "Di" stands for a lens thickness or an air space between the i-th surface and the (i+1)th surface, "Ni" and "vi" respectively stand for a refractive index and an Abbe number of the i-th material with respect to d-line light. In addition, two surfaces closest to the image side are a filter material such as a liquid crystal low-pass filter or an infrared-ray cut filter. In addition, each of "B", "C", "D", "E", and "F" stands for an aspheric coefficient. The aspheric shape is expressed as $$X = \frac{(1/R)H^2}{1+\sqrt{1-(1+K)(H/R)^2}} + BH^4 + CH^6 + DH^8 + EH^{10}$$

where "X" denotes a displacement from a surface vertex along the optical axis in a position at a height "H" from the optical axis, "R" stands for a paraxial radius of curvature, and "K" stands for a conical coefficient.

In addition, "e-0X" stands for "×10$^{-X}$". "f" stands for the focal length, "Fno" stands for the F number, and "ω" stands for the semifield angle. In addition, the relationship between each conditional expression above and each exemplary embodiment is set forth in Table 1.

In numerical examples 1 through 4, the value for "D5" is negative. This is because counting is performed from the F number determination member SP to the positive lens G21 of the second lens unit L2a-d in order from the object side. For a specific configuration, as shown in FIG. 1, FIG. 5, FIG. 9, and FIG. 13, the F number determination member (aperture stop) SP is positioned closer to the image side by a distance equivalent to an absolute value D5 than the vertex on the object side of the lens surface of the positive lens G21a-d of the second lens unit L2a-d on the object side.

Numerical Example 1
f = 5.96-22.74  Fno = 2.83-5.67  2ω = 58.7°-16.8°

| R1 = 70.717 | D1 = 1.60 | N1 = 1.859600 | v1 = 40.4 |
| R2 = 5.697 | D2 = 1.80 | | |
| R3 = 9.942 | D3 = 2.15 | N2 = 1.846660 | v2 = 23.9 |
| R4 = 31.390 | D4 = Variable | | |
| R5 = Stop | D5 = -0.50 | | |
| R6 = 4.649 | D6 = 1.94 | N3 = 1.804470 | v3 = 40.9 |
| R7 = 13.609 | D7 = 0.50 | N4 = 1.728250 | v4 = 28.5 |
| R8 = 3.922 | D8 = 0.83 | | |
| R9 = 10.518 | D9 = 0.50 | N5 = 2.003300 | v5 = 28.3 |
| R10 = 5.308 | D10 = 1.80 | N6 = 1.772499 | v6 = 49.6 |
| R11 = -37.360 | D11 = Variable | | |
| R12 = 12.648 | D12 = 1.50 | N7 = 1.487490 | v7 = 70.2 |
| R13 = 113.450 | D13 = Variable | | |
| R14 = ∞ | D14 = 1.40 | N8 = 1.516330 | v8 = 64.1 |
| R15 = ∞ | | | |

| | Focal Length | | |
|---|---|---|---|
| Variable Space | 5.96 | 14.33 | 22.74 |
| D4 | 20.50 | 5.43 | 1.47 |
| D11 | 7.62 | 16.28 | 24.93 |
| D13 | 2.58 | 2.53 | 2.48 |

Aspheric Coefficients

R2: k = -2.11620e+00  B = 9.84449e-04  C = -1.16189e-05
    D = 1.96807e-07   E = -1.99226e-09
R6: k = -4.32438e-01  B = 2.01382e-04  C = 5.92409e-06
    D = 4.04660e-07   E = 0.00000e+00

Numerical Example 2
f = 5.97-23.80  Fno = 2.87-5.86  2ω = 58.6°-16.0°

| R1 = 74.124 | D1 = 1.20 | N1 = 1.851350 | v1 = 40.1 |
| R2 = 5.717 | D2 = 1.80 | | |
| R3 = 9.882 | D3 = 2.15 | N2 = 1.846660 | v2 = 23.9 |
| R4 = 29.414 | D4 = Variable | | |
| R5 = Stop | D5 = -0.50 | | |
| R6 = 4.513 | D6 = 1.94 | N3 = 1.804470 | v3 = 40.9 |
| R7 = 7.214 | D7 = 0.50 | N4 = 1.805181 | v4 = 25.4 |
| R8 = 3.854 | D8 = 0.83 | | |
| R9 = 9.715 | D9 = 0.50 | N5 = 2.000690 | v5 = 25.5 |
| R10 = 5.594 | D10 = 1.80 | N6 = 1.772499 | v6 = 49.6 |
| R11 = -36.753 | D11 = Variable | | |
| R12 = 11.371 | D12 = 1.50 | N7 = 1.487490 | v7 = 70.2 |
| R13 = 50.010 | D13 = Variable | | |
| R14 = ∞ | D14 = 1.40 | N8 = 1.516330 | v8 = 64.1 |
| R15 = ∞ | | | |

| | Focal Length | | |
|---|---|---|---|
| Variable Space | 5.97 | 14.87 | 23.80 |
| D4 | 20.83 | 5.18 | 1.23 |
| D11 | 8.73 | 17.51 | 26.29 |
| D13 | 1.53 | 1.48 | 1.43 |

Aspheric Coefficients

R2: k = -2.13650e+00  B = 9.90788e-04  C = -1.06669e-05
    D = 1.25998e-07   E = -5.67618e-10
R6: k = -4.23174e-01  B = 2.28241e-04  C = 6.49652e-06
    D = 5.91858e-07   E = 0.00000e+00

Numerical Example 3
f = 5.93-22.74  Fno = 2.85-5.73  2ω = 58.9°-16.8°

| R1 = 60.706 | D1 = 1.40 | N1 = 1.859600 | v1 = 40.4 |
| R2 = 5.639 | D2 = 1.80 | | |
| R3 = 9.685 | D3 = 2.15 | N2 = 1.846660 | v2 = 23.9 |
| R4 = 27.516 | D4 = Variable | | |
| R5 = Stop | D5 = -0.50 | | |
| R6 = 5.422 | D6 = 1.80 | N3 = 1.804470 | v3 = 40.9 |
| R7 = 8.653 | D7 = 0.20 | | |
| R8 = 6.686 | D8 = 0.70 | N4 = 1.761821 | v4 = 26.5 |
| R9 = 4.624 | D9 = 0.83 | | |
| R10 = 15.406 | D10 = 0.50 | N5 = 2.187000 | v5 = 24.0 |
| R11 = 6.370 | D11 = 1.80 | N6 = 1.804000 | v6 = 46.6 |
| R12 = -18.670 | D12 = Variable | | |
| R13 = 14.038 | D13 = 1.50 | N7 = 1.487490 | v7 = 70.2 |
| R14 = 113.450 | D14 = Variable | | |
| R15 = ∞ | D15 = 1.40 | N8 = 1.516330 | v8 = 64.1 |
| R16 = ∞ | | | |

| | Focal Length | | |
|---|---|---|---|
| Variable Space | 5.93 | 14.32 | 22.74 |
| D4 | 20.07 | 5.07 | 1.14 |
| D12 | 7.62 | 16.28 | 24.93 |
| D14 | 2.78 | 2.73 | 2.68 |

Aspheric Coefficients

R2: k = -1.99863e+00  B = 9.37155e-04  C = -6.39487e-06
    D = 8.78059e-09   E = 7.48206e-10
R6: k = -4.64253e-01  B = 6.78602e-05  C = 1.90961e-06
    D = 6.75275e-08   E = 0.00000e+00

-continued

Numerical Example 4
f = 5.97-22.74 Fno = 2.86-5.67 2ω = 58.6°-16.8°

| | | | |
|---|---|---|---|
| R1 = 71.446 | D1 = 1.10 | N1 = 1.848620 | v1 = 40.0 |
| R2 = 5.767 | D2 = 1.80 | | |
| R3 = 9.925 | D3 = 2.15 | N2 = 1.846660 | v2 = 23.9 |
| R4 = 29.579 | D4 = Variable | | |
| R5 = Stop | D5 = −0.50 | | |
| R6 = 4.514 | D6 = 1.94 | N3 = 1.804470 | v3 = 40.9 |
| R7 = 7.346 | D7 = 0.50 | N4 = 1.805181 | v4 = 25.4 |
| R8 = 3.862 | D8 = 0.83 | | |
| R9 = 9.830 | D9 = 0.50 | N5 = 2.000690 | v5 = 25.5 |
| R10 = 5.617 | D10 = 1.80 | N6 = 1.772499 | v6 = 49.6 |
| R11 = −35.305 | D11 = Variable | | |
| R12 = 11.291 | D12 = 1.50 | N7 = 1.487490 | v7 = 70.2 |
| R13 = 41.848 | D13 = Variable | | |
| R14 = ∞ | D14 = 1.40 | N8 = 1.516330 | v8 = 64.1 |
| R15 = ∞ | | | |

| | Focal Length | | |
|---|---|---|---|
| Variable Space | 5.97 | 14.34 | 22.74 |
| D4 | 21.09 | 5.42 | 1.29 |
| D11 | 8.43 | 16.48 | 24.54 |
| D13 | 1.66 | 1.61 | 1.56 |

Aspheric Coefficients

| | | | |
|---|---|---|---|
| R2: | k = −2.16490e+00 | B = 9.93336e−04 | C = −1.17902e−05 |
| | D = 1.90740e−07 | E = −1.73113e−09 | |
| R6: | k = −4.23647e−01 | B = 2.25574e−04 | C = 6.70937e−06 |
| | D = 5.69112e−07 | E = 0.00000e+00 | |

TABLE 1

| | Numerical Example | | | |
|---|---|---|---|---|
| | 1 | 2 | 3 | 4 |
| Condition (1) | 1.85960 | 1.85135 | 1.85960 | 1.84862 |
| Condition (2) | 2.41 | 2.88 | 2.61 | 3.02 |
| Condition (3) | 0.66 | 0.63 | 0.65 | 0.67 |
| Condition (4) | 0.48 | 0.49 | 0.50 | 0.49 |
| Condition (5) | 1.18 | 1.17 | 1.20 | 1.18 |
| Condition (6) | −1.93 | −2.01 | −2.09 | −2.01 |
| Condition (7) | 1.26 | 1.25 | 1.44 | 1.37 |
| Condition (8) | 0.76 | 0.73 | 0.76 | 0.70 |
| Condition (9) | 0.24 | 0.22 | 0.24 | 0.22 |

An exemplary embodiment of a digital still camera (image pickup apparatus) that uses a zoom lens according to an exemplary embodiment of the present invention as a photographic optical system is described below with reference to FIG. 17.

Referring to FIG. 17, the digital still camera includes a camera body 20, a photographic optical system 21 that includes a zoom lens according to an exemplary embodiment of the present invention, and a solid-state image sensor (photoelectrical conversion element) 22, such as a CCD sensor or a CMOS sensor, that receives an object image formed by the photographic optical system 21. The digital still camera further includes a memory 23 configured to record information corresponding to an object image photoelectrically converted by the solid-state image sensor 22. The digital still camera further includes a viewfinder 24 that includes a liquid crystal display panel configured to allow a user to observe an object image formed on the solid-state image sensor 22.

With a zoom lens according to an exemplary embodiment of the present invention applied to an image pickup apparatus such as a digital still camera, an image pickup apparatus that is small in size and has a high optical performance can be implemented.

As described above, according to an exemplary embodiment, a zoom lens can be implemented which is small in size and has a high zoom ratio. Furthermore, an image pickup apparatus having the zoom lens can be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-343954 filed Nov. 29, 2005, which is hereby incorporated by reference herein in its entirety.

What is claimed is:

1. A zoom lens comprising, in order from an object side to an image side:

a first lens unit having a negative refractive power;

a second lens unit having a positive refractive power; and a third lens unit having a positive refractive power, wherein an interval between the first lens unit and the second lens unit at a telephoto end is smaller than an interval between the first lens unit and the second lens unit at a wide-angle end, wherein an interval between the second lens unit and the third lens unit at the telephoto end is larger than an interval between the second lens unit and the third lens unit at the wide-angle end, wherein the first lens unit includes, in order from the object side to the image side, one negative lens whose surface on the image side has a concave shape and one positive lens whose surface on the object side has a convex shape, wherein at least one surface of the negative lens has an aspheric shape, and wherein a refractive index of a material of the negative lens ($N11$), a thickness of a center portion of the negative lens ($DC$), a distance from a surface vertex on a lens surface of the negative lens on the object side to an optical effective diameter thereof along an optical axis ($SG1$), a distance from a surface vertex on a lens surface of the negative lens on the image side to an optical effective diameter thereof along the optical axis ($SG2$), a focal length of the first lens unit ($f1$), and a focal length of the zoom lens at the telephoto end ($ft$) satisfy following conditions:

$1.84 < N11 < 2.00$ $2.2 < (DC - SG1 + SG2)/DC < 3.2$ $0.5 < |f11/ft| < 0.8$.

2. The zoom lens according to claim 1, wherein the first lens unit consists of the negative lens and the positive lens in order from the object side to the image side.

3. The zoom lens according to claim 1, wherein a focal length of the negative lens ($f11$) satisfies the following condition:

$0.40 < |f11/f1| < 0.55$.

4. The zoom lens according to claim 1, wherein a radius of curvature of the lens surface of the negative lens on the object side ($R11a$) and a radius of curvature of the lens surface of the negative lens on the image side ($R11b$) satisfy the following condition:

$1.0 < (R11a + R11b)/(R11a - R11b) < 1.4$.

5. The zoom lens according to claim 1, wherein a radius of curvature of a lens surface of the positive lens on the object side (R12a) and a radius of curvature of a lens surface of the positive lens on the image side (R12b) satisfy the following condition:

$$-2.5<(R12a+R12b)/(R12a-R12b)<-1.0.$$

6. The zoom lens according to claim 1, wherein a focal length of the third lens unit (f3) satisfies the following condition:

$$1.0<f3/ft<1.5.$$

7. The zoom lens according to claim 1, wherein a maximum amount of movement of the second lens unit along the optical axis during zooming from the wide-angle end to the telephoto end (M2(0<M2)) satisfies the following condition:

$$0.68<M2/ft<0.8.$$

8. The zoom lens according to claim 1, wherein a distance from the lens surface of the negative lens on the object side to a lens surface of the positive lens on the image side (D1) satisfies the following condition:

$$0.20<D1/ft<0.27.$$

9. The zoom lens according to claim 1, wherein the zoom lens is adapted to form an image on a solid-state image sensor.

10. An image pickup apparatus comprising:
a zoom lens; and
an image sensor configured to receive an image formed by the zoom lens,
wherein the zoom lens comprises, in order from an object side to an image side:
a first lens unit having a negative refractive power;
a second lens unit having a positive refractive power; and
a third lens unit having a positive refractive power,
wherein an interval between the first lens unit and the second lens unit at a telephoto end is smaller than an interval between the first lens unit and the second lens unit at a wide-angle end,
wherein an interval between the second lens unit and the third lens unit at the telephoto end is larger than an interval between the second lens unit and the third lens unit at the wide-angle end,
wherein the first lens unit includes, in order from the object side to the image side, one negative lens whose surface on the image side has a concave shape and one positive lens whose surface on the object side has a convex shape,
wherein at least one surface of the negative lens has an aspheric shape, and
wherein a refractive index of a material of the negative lens (N11), a thickness of a center portion of the negative lens (DC), a distance from a surface vertex on a lens surface of the negative lens on the object side to an optical effective diameter thereof along an optical axis (SG1), a distance from a surface vertex on a lens surface of the negative lens on the image side to an optical effective diameter thereof along the optical axis (SG2), a focal length of the first lens unit (f1), and a focal length of the zoom lens at the telephoto end (ft) satisfy following conditions:

$$1.84<N11<2.00$$

$$2.2<(DC-SG1+SG2)/DC<3.2$$

$$0.5<|f1|/ft<0.8.$$

* * * * *